United States Patent
French

(10) Patent No.: US 8,793,996 B2
(45) Date of Patent: Aug. 5, 2014

(54) INTERNAL COMBUSTION ENGINE WITH EXHAUST GAS RECIRCULATION

(75) Inventor: Pierre Bernard French, Holmfirth (GB)

(73) Assignee: Cummins Turbo Technologies Limited, Huddersfield (GB)

(*) Notice: Subject to any disclaimer, the term of this patent is extended or adjusted under 35 U.S.C. 154(b) by 1028 days.

(21) Appl. No.: 12/578,686

(22) Filed: Oct. 14, 2009

(65) Prior Publication Data

US 2010/0122530 A1 May 20, 2010

(30) Foreign Application Priority Data

Oct. 17, 2008 (GB) .................................. 0819027.4

(51) Int. Cl.
| | |
|---|---|
| *F02B 33/44* | (2006.01) |
| *F02B 37/00* | (2006.01) |
| *F02B 37/007* | (2006.01) |
| *F02B 37/013* | (2006.01) |
| *F02B 37/02* | (2006.01) |
| *F02B 37/18* | (2006.01) |
| *F02B 37/24* | (2006.01) |
| *F01N 5/04* | (2006.01) |

(52) U.S. Cl.
CPC ............. *F02B 37/001* (2013.01); *F02B 37/004* (2013.01); *F02B 37/007* (2013.01); *F02B 37/013* (2013.01); *F02B 37/025* (2013.01); *F02B 37/18* (2013.01); *F02B 37/24* (2013.01); *F01N 5/04* (2013.01)
USPC ....................................................... 60/605.2

(58) Field of Classification Search
CPC .... F02B 37/001; F02B 37/004; F02B 37/007; F02B 37/013; F02B 37/025; F02B 37/18; F02B 37/24; F01N 5/04
USPC ....................................................... 60/605.2
See application file for complete search history.

(56) References Cited

U.S. PATENT DOCUMENTS

| | | | | |
|---|---|---|---|---|
| 5,791,146 | A * | 8/1998 | Dungner ....................... | 60/605.2 |
| 5,794,445 | A | 8/1998 | Dungner | |
| 6,205,785 | B1 | 3/2001 | Coleman | |
| 8,176,736 | B2 * | 5/2012 | Janssen ......................... | 60/605.2 |
| 8,297,054 | B2 * | 10/2012 | Gladden et al. ............... | 60/605.2 |
| 2007/0193270 | A1 * | 8/2007 | Roozenboom et al. ....... | 60/605.2 |

FOREIGN PATENT DOCUMENTS

| | | |
|---|---|---|
| DE | 695 25 773 T2 | 10/2002 |
| JP | 2004100508 | 4/2004 |

(Continued)

OTHER PUBLICATIONS

Great Britain Search Report, GB0819027.4, Feb. 20, 2009, Cummins Turb Technologies Limited.

*Primary Examiner* — Mary A Davis
(74) *Attorney, Agent, or Firm* — Krieg DeVault LLP; Clifford W. Browning

(57) ABSTRACT

An internal combustion engine has a turbocharger system and an exhaust gas recirculation (EGR) path. The turbocharger system comprises an inlet, an outlet and at least one turbocharger. The exhaust gas recirculation path recirculates a flow of exhaust gas to the air intake path. An EGR turbocharger has a turbine with an inlet in fluid communication with a first location in the exhaust gas path and an outlet in fluid communication with a second location in the exhaust gas path. The first and second locations being disposed such that, in use, the pressure difference of the gas between the inlet and outlet of the EGR turbine is less than the pressure difference of the gas between the inlet and outlet of the turbocharger system. The expansion ratio across the EGR turbine is therefore less than that across the turbocharger system and the EGR turbocharger is able to operate with greater efficiency.

24 Claims, 10 Drawing Sheets

(56) References Cited

FOREIGN PATENT DOCUMENTS

| | | |
|---|---|---|
| JP | 2005299615 | 10/2004 |
| KR | 20030013599 | 2/2003 |
| WO | WO 2005/019618 | 3/2005 |
| WO | WO 2008/013157 | 1/2008 |
| WO | WO 2008/062254 | 5/2008 |

* cited by examiner

INTERNAL COMBUSTION ENGINE WITH EXHAUST GAS RECIRCULATION

CROSS REFERENCE TO RELATED APPLICATIONS

The present application claims the benefit of United Kingdom Patent Application No. 0819027.4 filed Oct. 17, 2008.

The present invention relates to an internal combustion engine, and in particular to an engine having a turbocharger system and exhaust gas recirculation (EGR). More particularly still, the invention relates to an engine provided with an EGR turbocharger, the compressor of which is disposed within the exhaust gas recirculation path.

BACKGROUND OF THE INVENTION

Turbochargers are well-known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber within which the turbine wheel is mounted; an annular inlet passageway defined between facing radial walls arranged around the turbine chamber; an inlet arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway.

Another known approach to improving turbocharging efficiency for an engine with a wide speed/load range is to provide a sequential two-stage turbocharging system, comprising one relatively small high-pressure turbocharger and another relatively large low-pressure turbocharger. The turbochargers are arranged in series so that exhaust from the engine flows first through the smaller turbine of the high-pressure turbocharger and then through the larger turbine of the low-pressure turbocharger. A valve-controlled bypass passage is provided for allowing exhaust gas to bypass the high-pressure turbine at high engine speeds and/or loads. Similarly, the compressors of the two turbochargers are also arranged in series, with air flowing first through the relatively large compressor of the low-pressure turbocharger and then through the relatively small compressor of the high-pressure turbocharger. Again, a valve-controlled bypass is provided to allow the inlet air to bypass the compressor of the high-pressure turbocharger at high engine speeds and/or loads.

Oxides of nitrogen ($NO_x$), which are recognised to be harmful to the environment, are produced during the combustion process in an engine. In order to meet legislation intended to limit emissions exhaust gas recirculation (EGR) systems are used, in which a portion of the engine exhaust gas is recirculated through the combustion chambers. This is typically achieved by directing an amount of the exhaust gas from the exhaust manifold to the inlet manifold of the engine. The recirculated exhaust gas partially quenches the combustion process of the engine and hence lowers the peak temperature produced during combustion. As $NO_x$ production increases with increased peak temperature, recirculation of exhaust gas reduces the amount of undesirable $NO_x$ formed. Turbochargers may form part of the EGR system.

In order to introduce exhaust gas into the intake manifold, the recirculated exhaust gas must be at a higher pressure than that of the intake gas. However, in a turbocharged engine, the intake gas is typically at a pressure higher than that of the exhaust gas. This is due to the fact that the turbocharger compressor increases the pressure of the intake gas. As such, the pressure differential between the exhaust gas and intake gas is often in the incorrect direction to have flow from the exhaust system to the intake system.

A known EGR system for an engine with a turbocharger comprises a second turbocharger which operates in parallel with the standard turbocharger. The second turbocharger, herein known as the EGR turbocharger, has a turbine, which like the standard turbocharger, is powered by a portion of the engine exhaust; and a compressor which is fed with a portion of the engine exhaust gas, the compressor pressurising the exhaust gas and feeding it to the inlet manifold. As such, the turbine of the EGR turbocharger drives the EGR turbocharger compressor so that the EGR turbocharger acts as a pump, pumping a portion of engine exhaust gas to the engine intake. The EGR turbocharger turbine outlet is common with the turbine outlet of the standard turbocharger. As such, the EGR turbocharger is powered by the full pressure difference between the exhaust manifold of the engine and the (substantially) atmospheric pressure downstream of the standard turbocharger.

One difficulty with the use of an EGR turbocharger is that its efficiency is reduced owing to disparate pressure differences across the EGR turbocharger compressor and turbine respectively. In general the pressure difference across the EGR turbocharger turbine is much greater than that across the compressor. This is due to the fact that, in general, only a relatively low compression of the EGR gas by the EGR turbocharger compressor is required.

SUMMARY OF THE INVENTION

It is an object of the present invention to obviate or mitigate at least some of the problems associated with providing an EGR turbocharger. It is also an object of the present invention to provide for an internal combustion engine with an improved or alternative exhaust gas recirculation system.

According to a first aspect of the present invention there is provided an internal combustion engine, comprising: an air intake path; an exhaust gas path; a turbocharger system comprising an inlet, an outlet and at least one turbocharger having a first turbine in the exhaust gas path and drivingly connected to a first compressor disposed in the intake path and for supplying compressed air; an exhaust gas recirculation (EGR) path in fluid communication with the exhaust gas path and the intake path for directing a recirculation flow of exhaust gas to the air intake path; an EGR turbocharger comprising an EGR compressor in the exhaust gas recirculation path and an EGR turbine; the EGR turbine having an inlet in fluid communication with a first location in the exhaust gas path and an outlet in fluid communication with a second location in the exhaust gas path, the first location being upstream of the second location, wherein the first and second locations are disposed such that, in use, the pressure difference of the gas between the inlet and outlet of the EGR turbine is less than the pressure difference of the gas between the inlet and outlet of the turbocharger system.

The arrangement solves the problem of diminished efficiency of the EGR turbocharger by enabling a reduction in the expansion ratio across the EGR turbine in comparison to prior art systems. This is achieved by connecting the EGR turbine into or across part of the exhaust gas path extending between the inlet and outlet of the turbocharger system (the inlet typically being at the pressure of an exhaust manifold of the engine and the outlet typically being at or close to atmospheric pressure). The arrangement may be configured such that there is a similar pressure difference across the turbine of the EGR turbocharger as is present across the compressor of the EGR turbocharger.

The pressure difference of the gas between the inlet and outlet of the EGR turbine, in use, may be, for example, less than 0.67 and, for example, between 0.167 and 0.67 of the pressure difference of the gas between the inlet and outlet of the turbocharger system. It may be between 0.34 and 0.5, or more preferably between 0.17 and 0.25. The pressure ratio (expansion ratio) across the EGR turbocharger may be, for example, up to 1.75.

The first turbine may comprise a turbine housing in which a turbine wheel is disposed for rotation about an axis, the turbine housing defining an exhaust gas inlet upstream of the turbine wheel and an exhaust gas outlet downstream of the turbine wheel; and at least one of the first and second locations is between the exhaust gas inlet and outlet of the first turbine housing. A gas flow port may be provided in the first turbine housing at one of the first or second locations so as to provide flow communication between the exhaust gas path and the EGR turbine.

The first turbine may be of a variable geometry type with a variable geometry inlet passage and the gas flow port being in direct flow communication with said variable geometry inlet passage. The EGR turbine may similarly be a variable geometry turbine with a variable geometry inlet passage.

The gas flow port may be provided at the first location in the first turbine housing and the second location may be at the exhaust gas outlet of the first turbine housing. Alternatively, the first location may be upstream of the exhaust gas inlet of the first turbine housing and the gas flow port may be provided at the second location in the first turbine housing. In a further alternative embodiment, a first gas flow port is provided in the first turbine housing at the first location and a second gas port in the first turbine housing at the second location such that the EGR turbine is connected across the exhaust gas part defined in part of the first turbine housing.

In a yet further alternative embodiment the EGR turbine is disposed in the exhaust path such that the inlet and outlet of the EGR turbine are both upstream of the first turbine.

The turbocharger system may further comprise at least one turbomachine downstream of the first turbocharger, the turbomachine comprising at least a second turbine, which may be a power turbine suitable for driving a device that is powered by rotary motion such as, for example, a motor/generator. In another embodiment the turbomachine is a second turbocharger having a second turbine downstream of the first turbine and a second compressor. The first turbocharger may be a relatively high-pressure turbocharger whilst the second may be a relatively low-pressure turbocharger.

At least one of the first and second locations may be between the first and second turbine. For example, the first location may be upstream of the first turbine and the second location between the first and second turbines, preferably anywhere between first and second turbine wheels of the respective first and second turbines.

The first turbine may comprise a turbine housing in which a turbine wheel is disposed for rotation about an axis, the turbine housing defining an exhaust gas inlet upstream of the turbine wheel and an exhaust gas outlet downstream of the turbine wheel; and a gas flow port may be defined in the turbine housing at the first location and the second location may be in a part of the exhaust gas path that interconnects the first and second turbines, may be downstream of the second turbine, or may be at a gas flow port in a housing of the second turbine. Alternatively the first location may be upstream of the exhaust gas inlet of the first turbine and the second location may be in a part of the exhaust gas path that interconnects the first and second turbines, or the first location may be in a part of the exhaust gas path interconnecting the first and second turbines and the second location may be downstream of the second turbine or may be at a gas port defined in the housing of the second turbine between an inlet and outlet thereof.

In embodiments where the first or second location is in a part of the exhaust gas path that interconnects the first and second turbines, it is to be understood that this may be in a separate conduit interconnecting respective housings of the first and second turbines or may be defined in part of the respective turbine housings any where downstream of the turbine wheel of the first turbine and upstream of the turbine wheel of the second turbine.

There may be at least one further turbine situated in the exhaust gas path intermediate the first and second turbines, or downstream of the second turbine.

The second turbine and/or the at least one further turbine may be of a variable geometry type with a variable geometry inlet passage.

In various embodiments the exhaust gas recirculation path additionally comprises a valve that is operational to control the flow of exhaust gas in the EGR path. The valve may be, for example, a uni-directional flow valve, or a flow-restricting valve. In some embodiments said valve is a shut-off valve.

The EGR path may include a cooler which may be downstream of the compressor of said EGR turbocharger.

There may be provided a bypass conduit and/or a wastegate around at least one of the turbines.

In some embodiments the EGR turbocharger is cooled.

It will be understood that the turbocharger system may comprise a single-stage turbocharger or a multiple-stage turbocharger and in the latter case EGR turbine may be connected to gas port in any of the turbocharger turbine housings at the first and/or second locations.

A parallel or "twin" turbocharger may supplement the EGR turbocharger.

The exhaust gas path from the engine may be split into several subordinate paths e.g. there may be separate exhaust gas manifolds or an exhaust gas manifold of the engine may define multiple exhaust gas paths, each path flowing into the turbocharger system but the EGR turbocharger being disposed in only one of said multiple paths. Each of the paths may be supplied with exhaust gas from a specific combustion chamber or group of combustion chambers of the engine.

According to a further aspect of the invention there is provided an exhaust gas recirculation (EGR) system for an internal combustion engine, the EGR system comprising a turbocharger system comprising an inlet, an outlet and at least one turbocharger having a first turbine for connection into an exhaust gas path of the engine and drivingly connected to a first compressor for disposition in the intake path of the engine and for supplying compressed air; an EGR path for fluid communication with the exhaust gas path and the intake path for directing a recirculation flow of exhaust gas to the air intake path; an EGR turbocharger comprising an EGR compressor in the EGR path and an EGR turbine; the EGR turbine having an inlet for fluid communication with a first location in the exhaust gas path and an outlet for fluid communication with a second location in the exhaust gas path, the first location being upstream of the second location, wherein the first and second locations are disposed such that, in use, the pressure difference of the gas between the inlet and outlet of the EGR turbine is less than the pressure difference of the gas between the inlet and outlet of the turbocharger system.

According to a still further an aspect of the present invention there is provided a method of operating an internal combustion engine, comprising the steps of: directing exhaust gas through a turbocharger system in an exhaust gas path, the turbocharger system having an inlet, an outlet and at least one turbocharger having a first turbine in the exhaust gas path and drivingly connected to a first compressor disposed in an intake path of the engine and for supplying compressed air to the engine; recirculating exhaust gas in an exhaust gas recirculation (EGR) path from the exhaust gas path to the intake path of the engine via an EGR turbocharger having an EGR compressor in the EGR path and an EGR turbine; directing exhaust gas to an inlet of the EGR turbine in fluid communication with a first location in the exhaust gas path, the exhaust gas exiting the EGR turbine through an outlet in fluid communication with a second location in the exhaust gas path, the first location being upstream of the second location; such that the pressure difference of the gas between the inlet and outlet of the EGR turbine is less than the pressure difference of the gas between the inlet and outlet of the turbocharger system.

BRIEF DESCRIPTION OF THE DRAWINGS

Specific embodiments of the present invention will now be described, by way of example only, with reference to the accompanying drawings, in which.

DETAILED DESCRIPTION OF THE INVENTION

Figure 1:
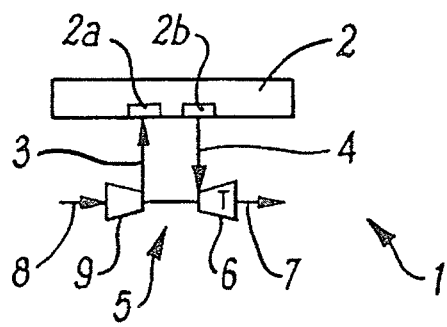
FIG. 1 is a schematic diagram illustrating a conventional engine comprising a single-stage turbocharger.

FIG. 1 shows a simplified schematic diagram of an internal combustion engine, indicated generally by reference numeral 1. A combustion unit 2 is fed with a combustion mixture including pressurised air via an intake path 3. Exhaust products from the combustion unit 2 are discharged via an exhaust path 4. The combustion unit 2 comprises one or more combustion chambers, the inlets to which are provided by a common inlet manifold 2a and the outlets to which are provided by a common exhaust manifold 2b.

A turbocharger 5 is connected across the intake path 3 and exhaust path 4, in flow communication therewith, such that combusted exhaust products are discharged via a turbine 6 to an exhaust outlet 7 and such that air is fed from a gas inlet 8 via a compressor 9 to inlet manifold 2a. Exhaust gas flows through the turbine 6, driving a turbine wheel in rotation about a shaft that, in turn, drives the compressor 9 in rotation. The operation of this turbocharger 5 is entirely conventional and as such further discussion of its operating principles is omitted. The intake path 3 is the path along which air travels from the gas inlet 8, via the compressor 9 and inlet manifold 2a in order to reach the combustion chamber(s). Likewise, the exhaust path 4 is the path along which exhaust gases travel from the combustion chamber(s), via the outlet manifold 2b and turbine 6 in order to reach the exhaust outlet 7.

Figure 2:
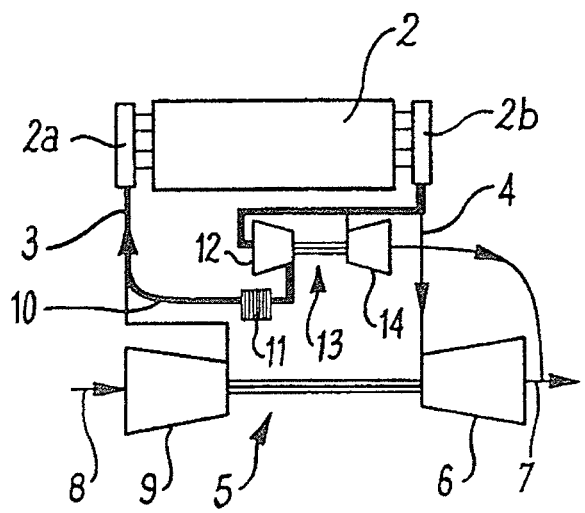
FIG. 2 is a schematic diagram illustrating a known engine comprising a single-stage turbocharger and an exhaust gas recirculation path which has an EGR turbocharger.

FIG. 2 shows a schematic diagram of a prior art engine with an exhaust gas recirculation (EGR) system. Although some features of the engine differ from that shown in FIG. 1, the layout is generally the same and where appropriate the same reference numbers are used to identify corresponding features. There is a first turbocharger 5 which functions in the manner described above and a second, EGR turbocharger 13 (smaller than the first) which comprises an EGR turbine 14 and an EGR compressor 12. An exhaust recirculation conduit (shown in bold and indicated generally by 10) links the exhaust path 4 to the intake path 3. A cooler 11 and the second compressor 12 are provided in said exhaust recirculation conduit 10.

The EGR turbine 14 is connected between the outlet manifold 2b and exhaust outlet 7. In this manner, the pressure difference between the gas in the outlet manifold 2b and the gas in the exhaust outlet 7 results in a flow of a portion of the exhaust gas through turbine 14 so as to drive the EGR turbocharger 13 in a conventional manner. A portion of the exhaust gas is directed to the EGR compressor 12 where it is compressed and then directed to the inlet manifold 2a. As such, the EGR turbocharger 13 operates as a pump so as to augment the exhaust gas recirculation flow from the exhaust path 4 to the inlet path 3.

In operation, the pressure difference across the EGR turbine 14 is the pressure difference between the gas in the outlet manifold 2b and the gas in the exhaust outlet 7. This pressure difference is significantly greater than the pressure difference across the EGR compressor 12. The disparity between the pressure differences across the turbine 14 and compressor 12 results in the EGR turbocharger operating with diminished efficiency. Since the turbine wheel and compressor wheel are fixed to one another they are forced to rotate at the same speed. However, in the absence of such a connection two different sized turbine/compressor wheels exposed to the same pressure difference/gas flow will naturally rotate at different speeds and, similarly, two similar sized turbine/compressor wheels exposed to different pressure differences/gas flows will also naturally rotate at different speeds. As such, different pressure differences across the different ends of the turbocharger will result in the compressor wheel and the turbine wheel naturally wanting to turn at different speeds. As the turbine wheel and compressor wheel are fixed to one another, the fact that the compressor 12 and turbine 14 naturally want to turn at different speeds leads to a reduction in the turbocharger 13 efficiency.

Figure 3:
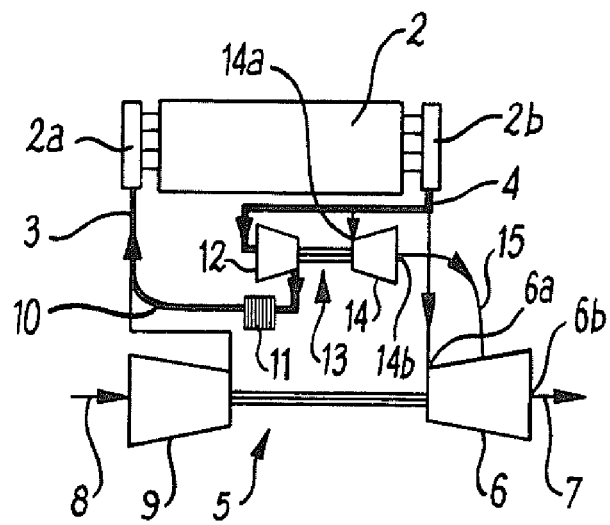
FIG. 3 is a schematic diagram illustrating an engine with a single-stage turbocharger and EGR according to a first embodiment of the invention.
Figure 4:
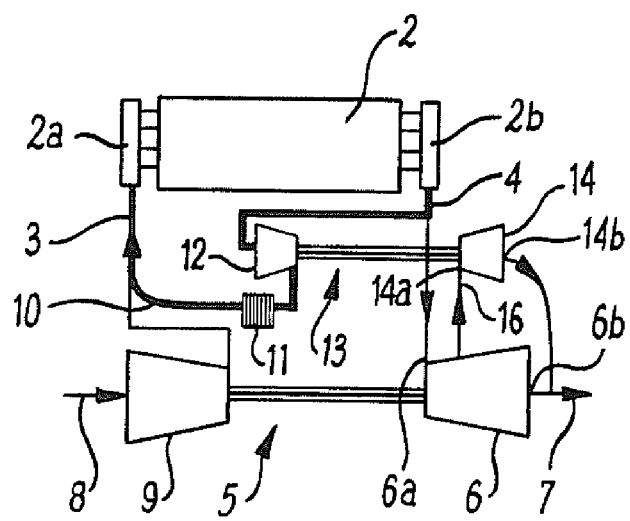
FIG. 4 is a schematic diagram illustrating an engine with a single-stage turbocharger and EGR according to a second embodiment of the invention.

FIGS. 3 and 4 both show separate embodiments of the present invention in the form of an engine 2 with a single-stage turbocharger system. They share some common features with the prior art as shown in FIG. 2 and as such corresponding components are numbered accordingly. In the embodiment shown in FIG. 3, the turbine 14 of the EGR turbocharger 13 has an inlet 14a connected downstream of the outlet manifold 2b; and an outlet 14b that is connected, via path 15, to a port in the first turbocharger turbine 6, the port being disposed between an inlet 6a and an outlet 6b of the turbine 6. In the embodiment shown in FIG. 4, the turbine 14 of the EGR turbocharger 13 has an inlet 14a connected, via path 16, to a port in the turbocharger turbine 6, the port being disposed between the inlet 6a and the outlet 6b of the turbine 6; and an outlet 14b which is connected upstream of the exhaust outlet 7.

In connecting the EGR turbine 14 to a port between the inlet 6a and outlet 6b of the turbine 6, unlike known EGR turbocharger systems, the turbine 14 is powered by a pressure difference which is less than the pressure difference between the outlet manifold 2b and exhaust outlet 7. Preferably the ratio of the pressure difference between the outlet manifold 2b and exhaust outlet 7 and the pressure difference across the EGR turbine 14 is less than 1:0.67. More preferably still, the ratio is between 1:0.25 and 1:0.17.

The compression required from the EGR compressor 12 is relatively low as the exhaust gas pressure at the outlet manifold 2b is generally very close to, and in some operating conditions greater than, that of the inlet manifold 2a. As previously discussed, having pressure differences across a turbocharger turbine and compressor which are similar increases the efficiency of the turbocharger. The present invention reduces the pressure difference across the EGR turbine 14, thereby making it closer to the pressure difference across the compressor 12, hence resulting in an increase in the EGR turbocharger efficiency.

Figure 5:
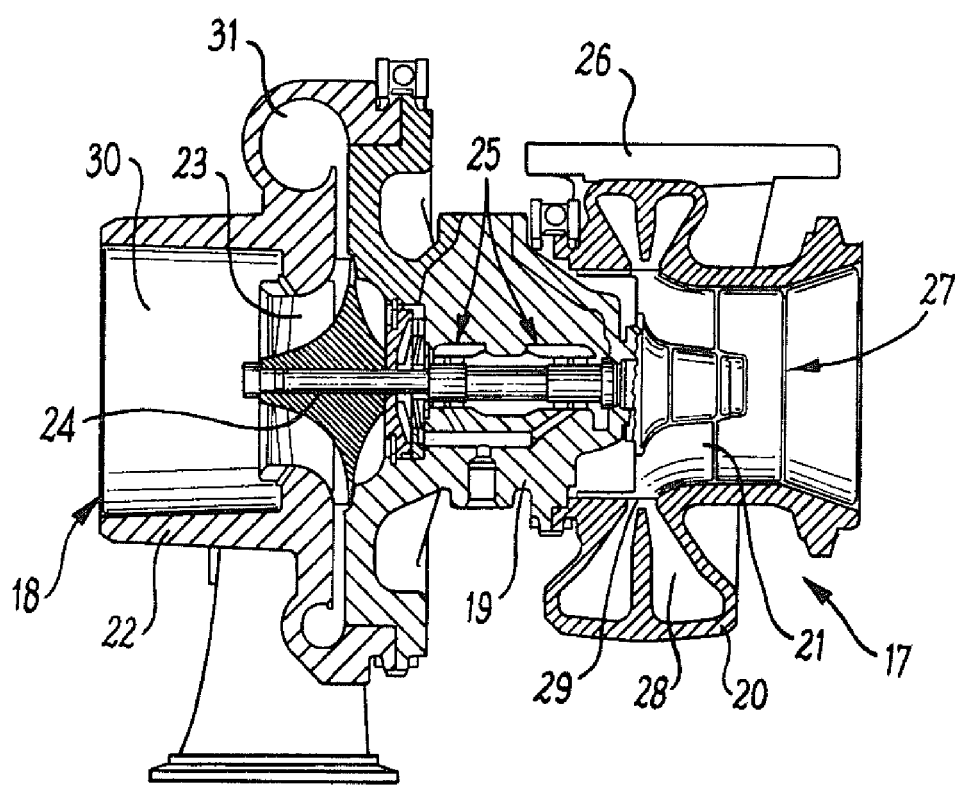
FIG. 5 is an axial cross-section through a turbocharger with a fixed geometry turbine which illustrates the basic components of a turbocharger.

FIG. 5 is an axial cross-section through a typical turbocharger with a fixed geometry turbine which illustrates the basic components of a turbocharger. In a particular embodiment of the present invention, such a turbocharger may be very similar in construction to said first turbocharger 5. The turbocharger comprises a turbine 17 joined to a compressor 18 via a central bearing housing 19. The turbine 17 comprises a turbine housing 20 which houses a turbine wheel 21. Similarly, the compressor 18 comprises a compressor housing 22 which houses a compressor wheel 23. The turbine wheel 21 and compressor wheel 23 are mounted on opposite ends of a common turbo shaft 24 which is supported on bearing assemblies 25 within the bearing housing 19.

The turbine housing 20 is provided with an exhaust gas inlet 26 and an exhaust gas outlet 27. The inlet 26 directs incoming exhaust gas to an annular inlet chamber, i.e. a volute 28 surrounding the turbine wheel 21 and communicating therewith via a radially extending annular inlet passageway 29. Rotation of the turbine wheel 21 rotates the compressor wheel 23 (via the shaft 24) which draws in air through an axial inlet 30 and delivers compressed air to the engine intake (not shown) via an annular outlet volute 31.

Figure 6:
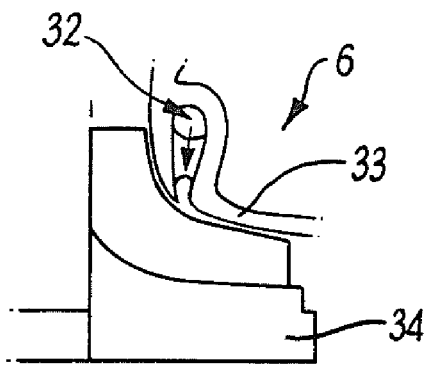
FIG. 6 is an axial cross-section through a turbine inlet port in accordance with the invention, said port being adjacent a portion of a conventional turbine wheel.

FIG. 6 shows part of the first turbocharger 5 of FIG. 3, and in particular a turbine inlet port 32. The turbine inlet port 32 is part of the turbine 6, which is otherwise of conventional design. The port 32 is an arcuate conduit in the turbine housing 33 which lies on a plane generally perpendicular to the axis of rotation of the turbine wheel 34. In order to maximise efficiency, the port 32 is configured such that exhaust gas emerging from the port 32 to the wheel 34 follows a curved path in the direction of rotation of the turbine wheel 34 and such that it is not directed at the axis of the turbine wheel 34. The turbine inlet port 32 forms part of the embodiment of the invention shown in FIG. 3, whereby the conduit 15 is connected to the turbine 6 between the inlet 6a and outlet 6b, via the inlet port 32.

Figure 7:
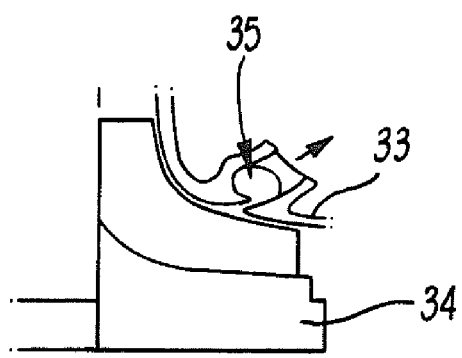
FIG. 7 is an axial cross-section through a turbine outlet port in accordance with the invention, said port being adjacent a portion of a conventional turbine wheel.

FIG. 7 shows part of the turbine 6 of FIG. 4 and, in particular, a turbine outlet port 35. The first turbocharger 5, as shown in FIG. 5, is otherwise conventional. The turbine outlet port 35 is part of the turbine 6 and is a curved conduit in the turbine housing 33. In order to maximise efficiency, the port 35 is such that, adjacent the turbine wheel 34, it is angled such that its opening generally faces the direction of oncoming gas which travels past the turbine wheel 34. The turbine outlet port 35 forms part of the embodiment of the invention shown in FIG. 4, whereby the conduit 16 is connected to the turbine 6, between the inlet 6a and outlet 6b, via the outlet port 35.

Figure 8:
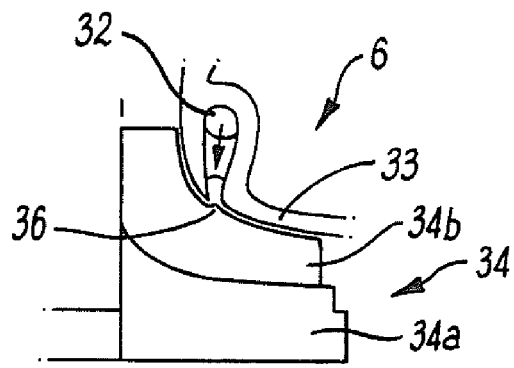
FIG. 8 is an axial cross-section through the turbine inlet port shown in FIG. 6, said port being adjacent a portion of a modified turbine wheel.
Figure 9:
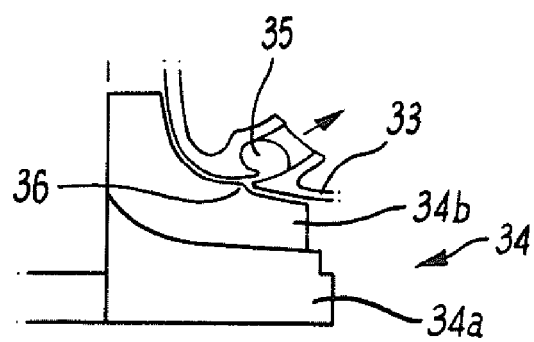
FIG. 9 is an axial cross-section through the turbine outlet port shown in FIG. 7, said port being adjacent a portion of an alternative modified turbine wheel.

FIGS. 8 and 9 show alternative embodiments of the turbine 34 similar to those shown in FIGS. 6 and 7 but with a modification to the turbine wheel. The turbine wheel 34 comprises a hub 34a, with a plurality of radially outward extending blades 34b. The efficiency of the turbine 6 is significantly affected by the degree of proximity between the blades 34b and the housing 33, i.e. the closer the blades 34b fit with the housing 33, the greater the turbine 6 efficiency. As the turbine ports 32, 35 necessarily create a gap between a conventional turbine and the housing 33 in the area of the port 32, 35, a radial protrusion 36 may be provided on the turbine blades 34b so as to minimise the gap between the turbine wheel 34 and housing 33 created by the port 32, 35, in order to increase turbine 6 efficiency.

Figure 10:
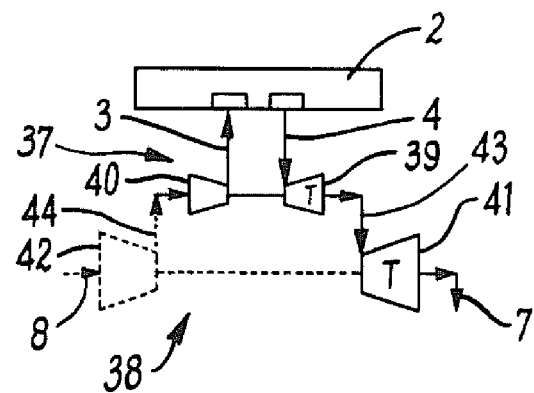
FIG. 10 is a schematic diagram illustrating a conventional engine comprising a two-stage turbocharger.

FIG. 10 shows a conventional engine comprising a two-stage turbocharger. The engine comprises a relatively small high pressure (HP) turbocharger 37 and a relatively large low pressure (LP) turbocharger 38 connected in series to the inlet manifold 2a and outlet manifold 2b of the combustion unit 2. The HP turbocharger 37 comprises a relatively small exhaust turbine 39 and a relatively small compressor 40. The LP turbocharger 30 comprises a relatively large exhaust turbine 41 and a relatively large compressor 42. The turbines 39, 41 are connected by path 43 such that exhaust gases pass from the combustion unit outlet manifold 2b to the turbine 39, then to the turbine 41 via path 43, and finally to the exhaust outlet 7. The compressors 37, 42 are connected by a path 44 such that air is supplied via the gas inlet 8 to the compressor 42, then to the compressor 40 via path 44, and to the combustion unit 2 via the inlet manifold 2a. The turbine 41 of the LP turbocharger may be a power turbine for driving something other than the compressor 42 (which is thus represented in dotted line) such as, for example, a generator or motor/generator.

Figure 11:
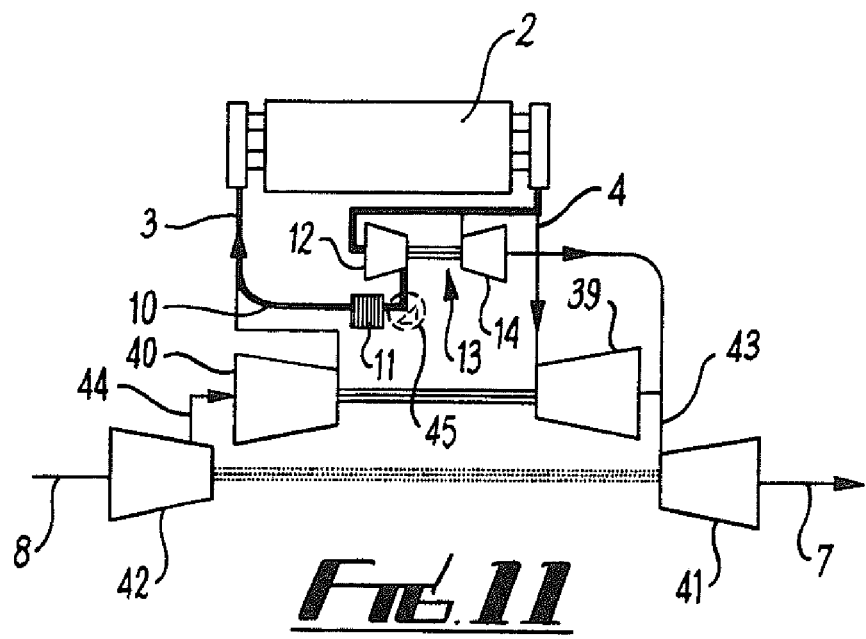
FIG. 11 is a schematic diagram illustrating an engine with a two-stage turbocharger and EGR according to a third embodiment of the invention.

FIG. 11 shows an engine comprising a two-stage turbocharger system and an EGR turbocharger 13 in accordance with an embodiment of the present invention. The features of the two-stage turbocharger are similar to that shown in FIG. 10 and as such corresponding features have been number accordingly. In addition, the features of the EGR turbocharger 13 are common with those of the previously described embodiments; again corresponding features of the EGR turbocharger 13 are numbered accordingly. The EGR turbocharger compressor 12 is connected by the EGR conduit 10 around the combustion unit 2 as in previously described embodiments. However, an inlet of the EGR turbocharger turbine 14 is connected to the outlet manifold 2b; and its outlet to the path 43 between the turbines 39, 41. In this manner, as in the previous embodiments, the pressure difference across the turbine 14 is less than the pressure difference between the outlet manifold 2b and exhaust outlet 7.

There are several other configurations of the EGR turbine 14 within an engine comprising a two-stage turbocharger which fall within the scope of the present invention. These include, for example: connecting the EGR turbine 14 between the path 43 between the turbines 39, 41 and the exhaust outlet 7; connecting the EGR turbine 14 between the outlet manifold 2b and a turbine inlet port (not shown, but it may be, for example, substantially similar to that shown in FIG. 6 or 8) on the high pressure (HP) turbocharger turbine 39; connecting the EGR turbine 14 between the outlet manifold 2b and a turbine inlet port (not shown but again it may be, for example, substantially similar to that shown in FIG. 6 or 8) on the low pressure (LP) turbocharger turbine 41; connecting the EGR turbine 14 between a turbine outlet port (not shown but substantially similar to that shown in FIG. 7 or 9) on the HP turbocharger turbine 39 and the path 43; connecting the EGR turbine 14 between a turbine outlet port on the HP turbocharger turbine 39 and the exhaust outlet 7; connecting the EGR turbine 14 between a turbine outlet port on the LP turbocharger turbine 41 and the exhaust outlet 7; and connecting the EGR turbine between a turbine outlet port on the HP turbine 39 and a turbine inlet port on the LP turbine 41. However, any other suitable connection of the turbine 14 is possible, as will be appreciated by a person skilled in the art, providing that the pressure difference across the turbine 14 is less than the pressure difference between the outlet manifold 2b and exhaust outlet 7.

In the embodiments of the invention relating to a single-stage turbocharger one approach to achieving a pressure difference across the turbine 14 that is less than that between the outlet manifold 2b and the exhaust outlet 7, is to ensure that at least one of the conduits (15 or 16), which link with the EGR turbocharger 13, is connected to a port in the turbine 6, between the turbine inlet 6a and turbine outlet 6b. However other arrangements are possible such as that depicted in FIG. 15 below. In embodiments of the invention relating to a two-stage turbocharger, in which there are at least two embodiments which require no connection between the turbine 14 and a port in either of turbines 39 and 41. It is sometimes desirable to minimise the number of connections that must be made between the EGR turbine 13 and any other turbine in any one embodiment. This is because any such turbine connection requires either a turbine inlet port 32 or turbine outlet port 35, which requires redesigning the relevant turbine housing and/or turbine wheel, which may be undesirable in certain circumstances.

Without prejudice to the above paragraph, it falls within the scope of the present invention to provide an embodiment in which the EGR turbine 14 is connected downstream of a turbine outlet port 35 and upstream of a turbine inlet port 32, both of which are formed as part of the turbine housing of the same turbine. In this situation it is conceived that the bearing housing of the EGR turbocharger 13 and the bearing housing which supports the turbine which is connected to the EGR turbine 14 may be integrated.

As shown in FIG. 11, the EGR conduit 10 may also include a one-way flow valve (shown in dashed lines and indicated as 45). The valve 45 may be situated at any point along the EGR conduit 10, but in the embodiment shown is situated intermediate the compressor 12 and cooler 11. The valve 45 prevents any gas flow from the inlet manifold 2a to the outlet manifold 2b via the EGR conduit 10, which may otherwise occur should the inlet manifold 2a pressure be greater than the outlet manifold 2b pressure.

Although all the hereinbefore described embodiments only show a cooler 11 after the EGR turbocharger compressor 12, equally, in order to increase the efficiency of the system, a further cooler may be positioned downstream of any other compressor (9, 40, 42) in the system. Any of the coolers may also comprise a bypass passage, such that under certain conditions (i.e. those where the gas does not require cooling) gas can flow around the cooler instead of through it.

It should be noted that in the hereinbefore described embodiments, the output of the EGR compressor 12 is downstream of any other compressors (9, 40, 42) which form part of the engine. This is preferable as the exhaust gas travelling through the EGR conduit 10 contains soot and contaminants, which if allowed to pass through a standard compressor would lead to soot build up or other contamination problems with said standard compressor. Although connecting the compressor 12 output downstream of any other compressors (9, 40, 42) is preferable, it will be appreciated that that with the use of suitable compressors and/or filtration equipment the compressor 12 output could be connected to any point upstream of the combustion unit inlet manifold 2a, including upstream of any other compressors.

It is within the scope of the invention that gas flow to the EGR turbine 14 may be blocked by the use of an appropriate valve (not shown), so as to close the EGR conduit 10 under certain conditions, such that no gas is recirculated. As a further possibility, it may be desirable to have a selective EGR turbine bypass, such that under certain conditions exhaust gas from the combustion unit is recirculated via the EGR conduit in a manner which is not augmented by the EGR turbocharger 13.

As is well known in the art, it may be desirable to provide a wastegate (not shown) around any of the turbines (6, 14, 39, 41) so as to control the gas flow to the turbine and hence the turbocharger speed and boost pressure of the turbocharger concerned.

In the place of any of the fixed geometry turbines 6, 14, 39, 41 of the embodiments above, it is also conceivable that a variable geometry turbine may be used. There are various types of variable geometry turbine known in the art, any of which could be used in the conventional manner. As such, further details of their operation are omitted.

Figure 12:
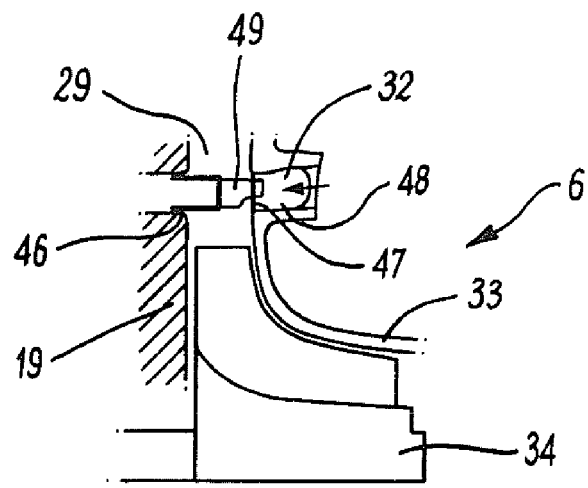
FIG. 12 is an axial cross section through an alternative embodiment of a turbine inlet port which forms part of a variable geometry turbine.

It is envisaged that in a further embodiment of the invention, as seen in FIG. 12, either a turbine inlet port 32 or turbine outlet port (not shown) may be integrated with a portion of the variable geometry turbine mechanism. The inlet passageway 29 is defined on one side by the face of a radial wall of a movable annular wall member 46 and on the opposite side by an annular shroud plate 47 that forms the wall of the inlet passageway 29 facing the nozzle ring 46. The shroud plate 47 covers the opening of an annular recess 48 in the turbine housing 33. The wall member 46 has an array of circumferentially and equally spaced inlet vanes 49 each of which extends axially across the inlet passageway 29, the arrangement being commonly referred to as a "nozzle ring". The vanes 49 are orientated to deflect gas flowing through the inlet passageway towards the direction of rotation of the turbine wheel 34. When the nozzle ring 46 is proximate to the annular shroud plate 47, the vanes 49 project through suitably configured slots (not shown) in the shroud plate 47, into the recess 48. The vanes 49 seal against the edges defining the slots so as to prevent any significant flow of gas into the recess 48 when the nozzle ring 46 is proximate the shroud plate 47. The inlet port 32 forms an opening into the recess 48 such that gas flow from the EGR turbine 14, passes via conduit 15 and the inlet port 32 into the recess 48. From the recess 48, the gas then flows through the slots in the shroud plate 47 and past the turbine wheel 34 via the inlet passageway 29. In operating the variable geometry turbine, as previously described, moving the nozzle ring 46 causes the proportion of each slot in the shroud plate 47 which is occupied by its respective vane 49 to vary. This enables the nozzle ring 46 to act as a valve by governing the flow rate at which gas from the inlet port 32 can pass through the slots in the shroud plate 47.

Figure 13:
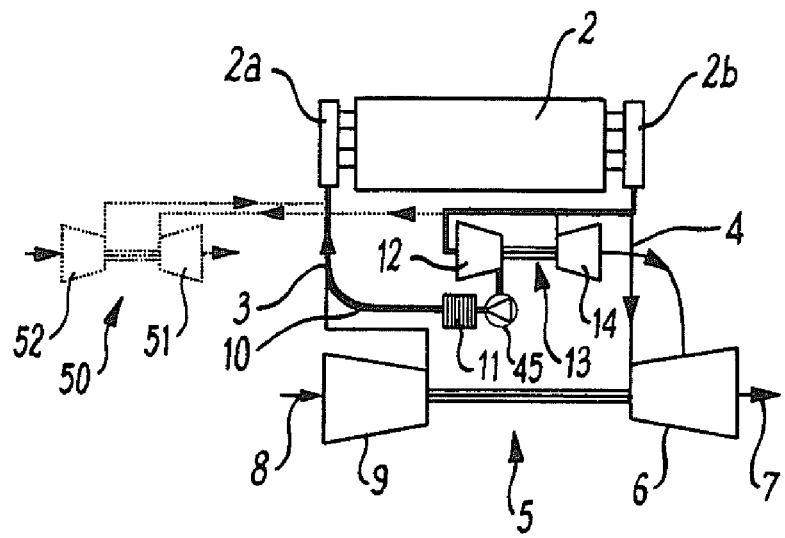
FIG. 13 is a schematic diagram illustrating an engine with a single-stage turbocharger with parallel twin turbochargers and EGR according to a fourth embodiment of the invention.

FIG. 13 shows an embodiment of the proposed invention which is very similar in nature to that shown in FIG. 3. It comprises an additional turbocharger 50 (represented in dotted line) which is in parallel with the EGR turbocharger 13. The turbocharger 50 comprises a turbine 51, the inlet of which is in fluid communication with the outlet manifold 2b. The outlet of the turbine 51 may be connected to anywhere that is at a lower pressure than the outlet manifold 2b, as will be appreciated by a person skilled in the art. The compressor 52 has an outlet which is in fluid communication with the inlet manifold 2a.

Figure 14:
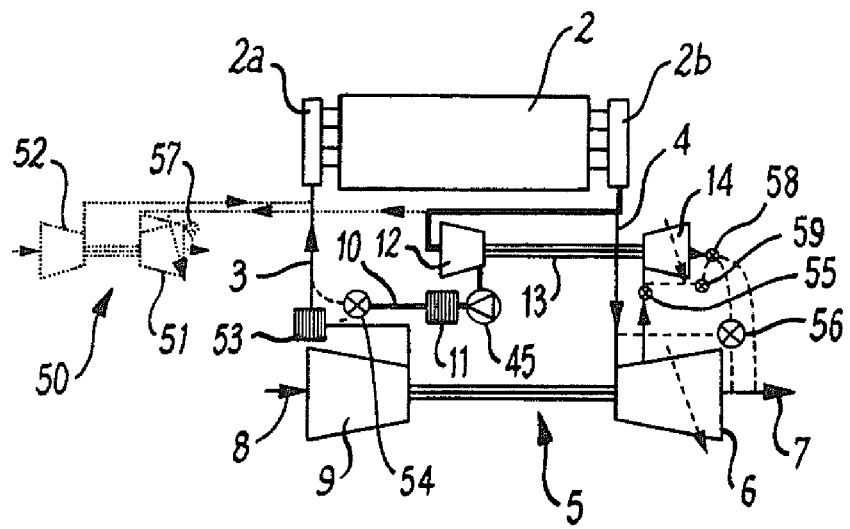
FIG. 14 is a schematic diagram of a fifth embodiment of an engine with a turbocharger system and EGR according to the invention, based on the embodiment shown in FIG. 13 having an additional intercooler and additional valves.

FIG. 14 shows a further embodiment of the invention in which there is an outlet port in the housing of the turbocharger turbine 6 that delivers a portion of the exhaust gas the inlet of the EGR turbine 14 whose outlet is in turn connected to a location downstream of the outlet of the turbocharger turbine 6. In this case, the turbines 6, 14, 51 are of a variable geometry type as described above, as the diagonal dashed arrow indicates. In addition, a further intercooler 53 is provided downstream of compressor 9, so as to increase efficiency. A bypass valve 54 is provided across the intercooler 53. The bypass valve 54 may provide one or more functions, including: bypassing the intercooler 53 such that air from the compressor 9 does not have to pass through the intercooler 53 as it moves to the inlet manifold 2a; and isolating the EGR path 10 from the intake path 3 such that no exhaust gas is recirculated from the exhaust path 4 to the inlet manifold 2a. In addition, one or more bypass valves 55, 56 and 57 may optionally be provided around turbines 14, 6 and 51 respectively. This allows exhaust gas to be directed around a respective turbine such that it does not operate. For example a valve 55 can be closed to prevent exhaust gas passing into the EGR turbine 14, whereas valve 56 is a wastegate for the turbocharger turbine 6. Valve 59 may be used to bypass the gas around the EGR turbine 14 whereas valve 58 may be used to direct exhaust gas from the EGR turbine outlet to the desired location downstream of the turbocharger turbine 6.

Figure 15:
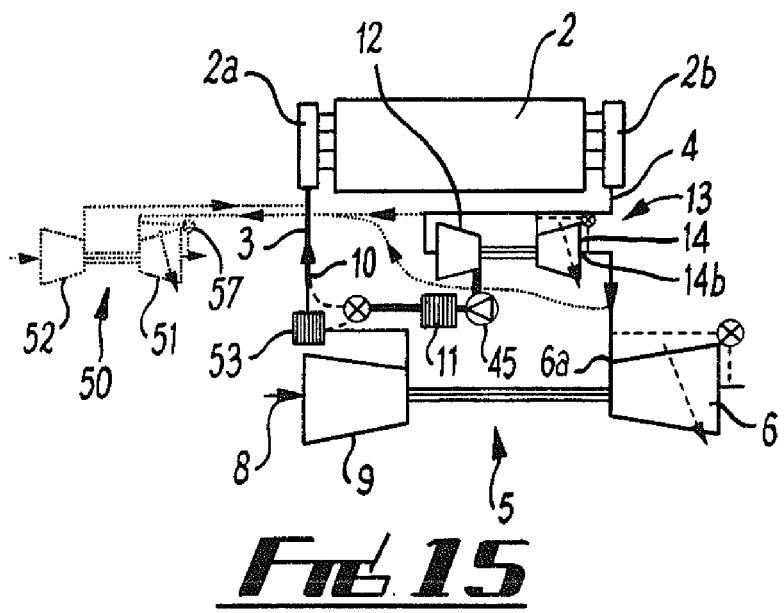
FIG. 15 is a schematic diagram of a sixth embodiment of an engine with turbocharger system and EGR according to the present invention.

FIG. 15 shows an example of a single-stage turbocharger system in which the EGR turbine 14 is disposed in the exhaust gas path 4 entirely upstream of the turbocharger turbine 6. In particular the inlet 14a of the EGR turbine 14 is connected to the exhaust manifold 2b of the engine and its outlet 14b is connected to the inlet 6a of the turbocharger turbine 6. Wastegate valves are again shown around the two turbines 6,14. In this embodiment the pressure drop across the EGR turbine 14 is designed to be less than that across the turbocharger system.

Figure 16:
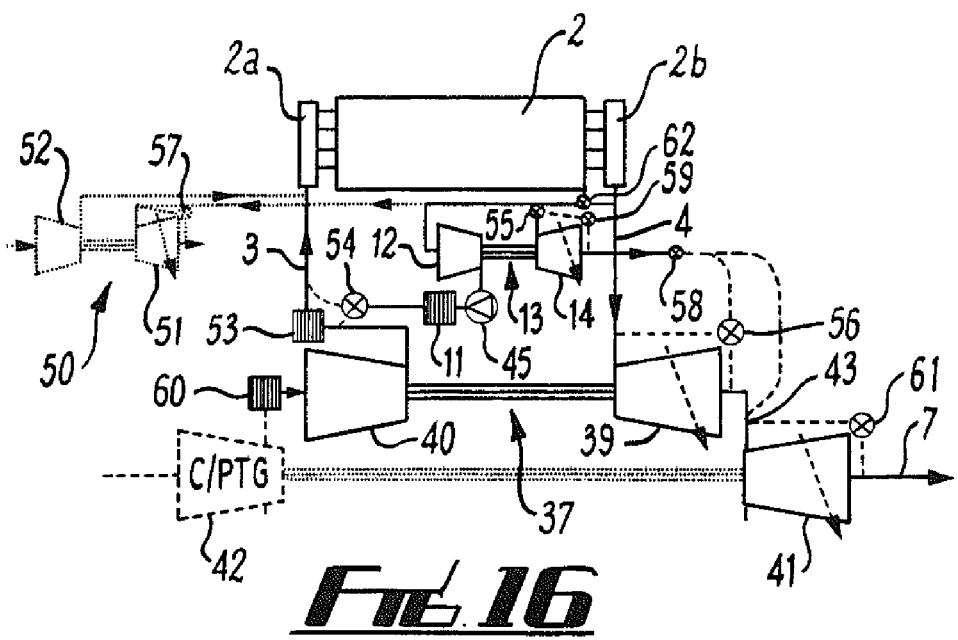
FIG. 16 is a schematic diagram of an engine with a two-stage turbocharger, parallel twin EGR turbochargers in accordance with a seventh embodiment of the invention.

FIG. 16 shows another embodiment of the proposed invention which comprises a two-stage turbocharger system similar to that shown in FIG. 11. As with the previous embodiment, this embodiment comprises a turbocharger 50 parallel to the EGR turbocharger 13, variable geometry turbines 14, 39, 41 and 51, intercoolers 11, 53 and 60, bypass valves 55, 56, 57 and 61; and further valves 58, 59 and 62. The compressor 42 (dashed) of the second stage LP turbocharger 38 may be replaced by any appropriate device which is powered by rotary motion, for example a generator, in which case the LP turbine 41 is a power turbine.

As previously discussed, the EGR turbocharger 13 comprises a compressor 12 and turbine 14 of conventional configuration. As is common with turbochargers, the compressor 12 and turbine 14 comprise a compressor wheel and turbine wheel respectively which are fixed on opposite ends of a turbocharger shaft for rotation therewith. The turbocharger shaft is supported by bearings within a bearing housing which is intermediate the compressor 12 and turbine 14. It is conventional for the turbine of a turbocharger to be supplied with exhaust gas which is at a higher temperature than that of the gas that is supplied to the compressor. In this way the compressor and gas passing through it can act as a heat sink for the turbocharger, cooling, in part, the turbocharger whose temperature is raised by the heat which is transmitted to the turbocharger by the hot turbine exhaust gas. This is not the case with the EGR turbocharger 13, as both the turbine 14 and compressor 12 are supplied by exhaust gas from the outlet manifold 2b which is at the same temperature. It is desirable to avoid overheating of the bearing housing as the bearings may be prevented from functioning properly. For example, if they are oil bearings, coking of the oil may occur. Any impairment of the bearings will result in a reduction in the efficiency of the turbocharger 13. For this reason, in some applications, the turbocharger 13, and more particularly its bearing housing, may be provided by with an appropriate cooling system such as, for example, a water cooling system.

Figure 17:
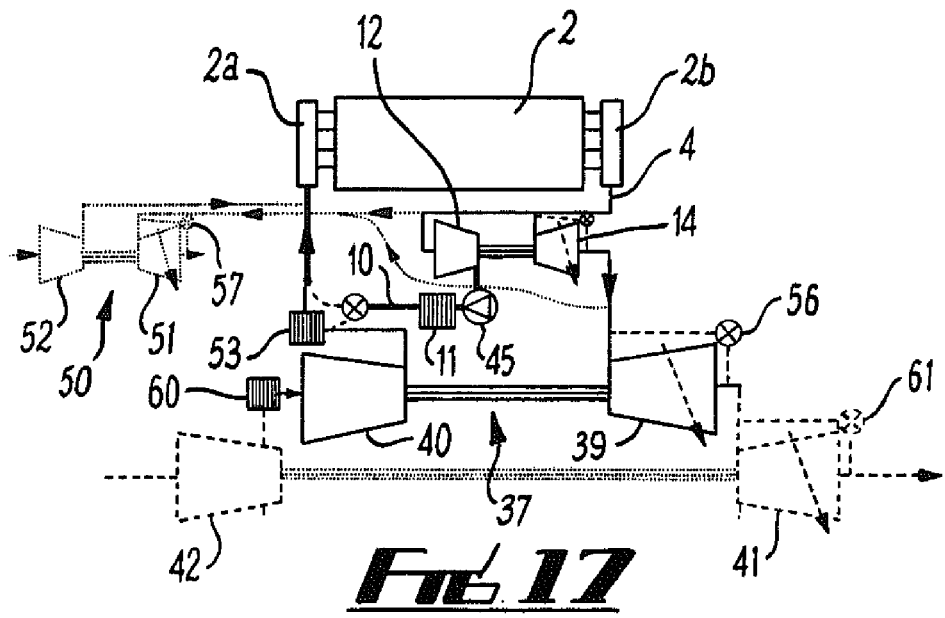
FIG. 17 is a schematic diagram of an engine with a two-stage turbocharger system showing an eighth embodiment of the present invention.

FIG. 17 is similar to that of FIG. 15 in that the EGR turbine 14 is connected entirely upstream of the turbocharger system which in this instance is a two-stage system (which in itself is similar to the system of FIG. 16) with the first stage being a turbocharger 37 having a turbine 39 and compressor 40, and the second stage being either a second turbocharger 38 with a turbine 41 and compressor 42, or a turbomachine in which the turbine is a power turbine 41 for driving any powered component 42 such as a generator or motor/generator.

Figure 18:
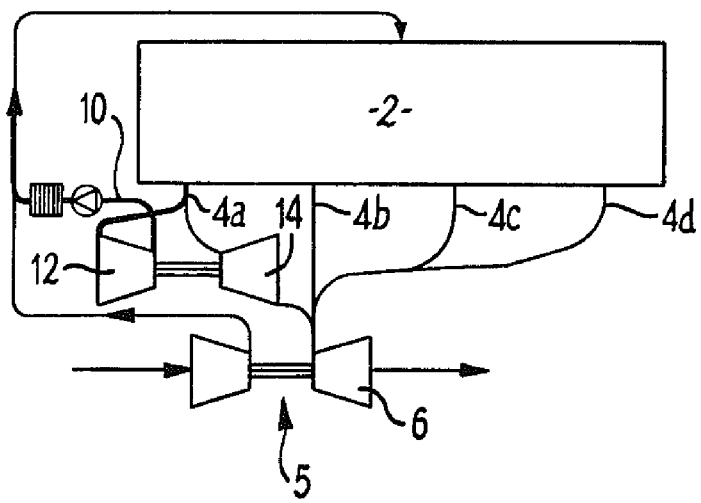
FIG. 18 is a schematic diagram of a ninth embodiment of the present invention in which an engine has multiple exhaust gas paths feeding into a turbocharger system and an EGR turbocharger.

FIG. 18 is an arrangement showing the exhaust gas having several paths 4a-4d that may be defined by an exhaust gas manifold of the engine. All of the exhaust paths feed into the turbine 6 of the single-stage turbocharger system 5 but only one, 4a, feeds exhaust gas to the EGR turbine 14, which is entirely upstream of the turbocharger turbine 6. The EGR path 10 through the EGR compressor 12 is again represented in bold and contains a flow control valve and intercooler. The arrangement allows for a reduced expansion ratio across the EGR turbine 14 compared to prior art systems.

It will be appreciated that a wide range of modifications and alterations may be made to the embodiments of the invention described hereinbefore without departing from the scope of the invention as defined by the appended claims.

The invention claimed is:

1. An internal combustion engine, comprising:
an air intake path;
a common exhaust manifold supplying exhaust gas to an exhaust gas path;
a turbocharger system comprising an inlet, an outlet and at least one turbocharger having a first turbine in the exhaust gas path and drivingly connected to a first compressor disposed in the intake path and for supplying compressed air;
an exhaust gas recirculation (EGR) path in fluid communication with the exhaust gas path and the intake path for directing a recirculation flow of exhaust gas to the air intake path;
an EGR turbocharger comprising an EGR compressor in the EGR path and an EGR turbine;
the EGR turbine having an inlet in fluid communication with a first location in the exhaust gas path and an outlet in fluid communication with a second location in the exhaust gas path, the first location being upstream of the second location, wherein the first and second locations are disposed such that, in use, the pressure difference of the gas between the inlet and outlet of the EGR turbine is less than the pressure difference of the gas between the inlet and outlet of the turbocharger system.

2. The internal combustion engine according to claim 1, wherein the first turbine comprises a turbine housing in which a turbine wheel is disposed for rotation about an axis, the turbine housing defining an exhaust gas inlet upstream of the turbine wheel and an exhaust gas outlet downstream of the turbine wheel; and at least one of the first and second locations is between the exhaust gas inlet and outlet of the first turbine housing.

3. The internal combustion engine according to claim 2, wherein a gas flow port is provided in the first turbine housing at one of the first or second locations.

4. The internal combustion engine according to claim 3, wherein the first turbine is a variable geometry turbine with a variable geometry inlet passage and the gas flow port is in direct flow communication with said variable geometry inlet passage.

5. The internal combustion engine according to claim 3, wherein the gas flow port is provided at the first location in the first turbine housing and the second location is at the exhaust gas outlet of the first turbine housing.

6. The internal combustion engine according to claim 3, wherein the first location is upstream of the exhaust gas inlet of the first turbine housing and the gas flow port is provided at the second location in the first turbine housing.

7. The internal combustion engine according to claim 1, wherein the EGR turbine is in the exhaust path, the inlet and outlet of the EGR turbine both being upstream of the first turbine.

8. The internal combustion engine according to claim 1, the turbocharger system further comprising at least one turbomachine downstream of the first turbocharger, the turbomachine comprising a second turbine.

9. The internal combustion engine according to claim 8, wherein said second turbine is a power turbine suitable for driving a device that is powered by rotary motion.

10. The internal combustion engine according to claim 9, wherein at least one of the first and second locations is between the first and second turbine.

11. The internal combustion engine according to claim 10, wherein said second turbine is of a variable geometry type with a variable geometry inlet passage.

12. The internal combustion engine according to claim 10, wherein the first location is upstream of the first turbine and the second locations is between the first and second turbine.

13. The internal combustion engine according to claim 10, wherein the first turbine comprises a turbine housing in which a turbine wheel is disposed for rotation about an axis, the turbine housing defining an exhaust gas inlet upstream of the turbine wheel and an exhaust gas outlet downstream of the turbine wheel; and wherein a gas flow port is defined in the turbine housing at the first location and the second location is in a part of the exhaust gas path that interconnects the first and second turbines.

14. The internal combustion engine according to claim 10, wherein the first turbine comprises a turbine housing in which a turbine wheel is disposed for rotation about an axis, the turbine housing defining an exhaust gas inlet upstream of the turbine wheel and an exhaust gas outlet downstream of the turbine wheel; and wherein a gas flow port is defined in the turbine housing at the first location and the second location is downstream of the second turbine.

15. The internal combustion engine according to claim 10, wherein the first turbine comprises a turbine housing in which a turbine wheel is disposed for rotation about an axis, the turbine housing defining an exhaust gas inlet upstream of the turbine wheel and an exhaust gas outlet downstream of the turbine wheel; and wherein the first location is upstream of the exhaust gas inlet of the first turbine and the second location is in a part of the exhaust gas path that interconnects the first and second turbines.

16. The internal combustion engine according to claim 10, wherein the first turbine comprises a turbine housing in which a turbine wheel is disposed for rotation about an axis, the turbine housing defining an exhaust gas inlet upstream of the turbine wheel and an exhaust gas outlet downstream of the turbine wheel; and wherein the first location is in a part of the exhaust gas path interconnecting the first and second turbines, and the second location is downstream of the second turbine.

17. The internal combustion engine according to claim 9, further comprising at least one further turbine situated in the exhaust gas path intermediate the first and second turbines or downstream of the second turbine.

18. The internal combustion engine according to claim 8, wherein said turbomachine is a second turbocharger having a second turbine downstream of the first turbine and a second compressor.

19. A method of operating an internal combustion engine, comprising the steps of:

directing exhaust gas through a turbocharger system in a common exhaust gas manifold supplying exhaust gas to an exhaust gas path, the turbocharger system having an inlet, an outlet and at least one turbocharger having a first turbine in the exhaust gas path and drivingly connected to a first compressor disposed in an intake path of the engine and for supplying compressed air to the engine;

recirculating exhaust gas in an exhaust gas recirculation (EGR) path from the exhaust gas path to the intake path of the engine via an EGR turbocharger having an EGR compressor in the EGR path and an EGR turbine; and directing exhaust gas to an inlet of the EGR turbine in fluid communication with a first location in the exhaust gas path, the exhaust gas exiting the EGR turbine through an outlet in fluid communication with a second location in the exhaust gas path, the first location being upstream of the second location; such that the pressure difference of the gas between the inlet and outlet of the EGR turbine is less than the pressure difference of the gas between the inlet and outlet of the turbocharger system.

20. An internal combustion engine, comprising:
an air intake path;
an exhaust gas path;
a turbocharger system comprising an inlet, an outlet and at least one turbocharger having a first turbine in the exhaust gas path and drivingly connected to a first compressor disposed in the intake path and for supplying compressed air;
an exhaust gas recirculation (EGR) path in fluid communication with the exhaust gas path and the intake path for directing a recirculation flow of exhaust gas to the air intake path;
an EGR turbocharger comprising an EGR compressor in the EGR path and an EGR turbine; the EGR turbine having an inlet in fluid communication with a first location in the exhaust gas path and an outlet in fluid communication with a second location in the exhaust gas path, the first location being upstream of the second location, wherein the first and second locations are disposed such that, in use, the pressure difference of the gas between the inlet and outlet of the EGR turbine is less than the pressure difference of the gas between the inlet and outlet of the turbocharger system;
wherein the first turbine comprises a turbine housing in which a turbine wheel is disposed for rotation about an axis, the turbine housing defining an exhaust gas inlet upstream of the turbine wheel and an exhaust gas outlet downstream of the turbine wheel; and at least one of the first and second locations is between the exhaust gas inlet and outlet of the first turbine housing.

21. The internal combustion engine according to claim 20, wherein a gas flow port is provided in the first turbine housing at one of the first or second locations.

22. The internal combustion engine according to claim 21, wherein the first turbine is a variable geometry turbine with a variable geometry inlet passage and the gas flow port is in direct flow communication with said variable geometry inlet passage.

23. The internal combustion engine according to claim 21, wherein the gas flow port is provided at the first location in the first turbine housing and the second location is at the exhaust gas outlet of the first turbine housing.

24. The internal combustion engine according to claim 21, wherein the first location is upstream of the exhaust gas inlet of the first turbine housing and the gas flow port is provided at the second location in the first turbine housing.

* * * * *